United States Patent
Simon

(10) Patent No.: US 7,388,465 B2
(45) Date of Patent: Jun. 17, 2008

(54) TAMPERING DETECTOR AND SYSTEM DISABLER

(75) Inventor: Michael P. Simon, Hemet, CA (US)

(73) Assignee: Payment Protection Systems, Inc., Murrieta, CA (US)

( * ) Notice: Subject to any disclaimer, the term of this patent is extended or adjusted under 35 U.S.C. 154(b) by 347 days.

(21) Appl. No.: 11/033,538

(22) Filed: Jan. 12, 2005

(65) Prior Publication Data

US 2005/0134438 A1    Jun. 23, 2005

Related U.S. Application Data

(62) Division of application No. 09/954,004, filed on Sep. 18, 2001, now Pat. No. 6,870,467.

(60) Provisional application No. 60/288,795, filed on May 7, 2001, provisional application No. 60/236,392, filed on Sep. 29, 2000.

(51) Int. Cl.
*G05B 19/00* (2006.01)

(52) U.S. Cl. ............... 340/5.31; 340/425.5; 340/426.1; 340/5.28; 340/5.42; 235/382

(58) Field of Classification Search ............. 340/425.5, 340/5.28, 5.31, 5.42, 426.1, 426.11, 9.1, 340/10.1, 5.5; 705/13; 235/382
See application file for complete search history.

(56) References Cited

U.S. PATENT DOCUMENTS

| | | | |
|---|---|---|---|
| 5,291,554 A | 3/1994 | Morales | |
| 5,381,128 A | 1/1995 | Kaplan | |
| 5,510,780 A | 4/1996 | Norris et al. | |
| 5,513,244 A | 4/1996 | Joao et al. | |
| 5,519,260 A | 5/1996 | Washington | |
| 5,586,130 A * | 12/1996 | Doyle | 714/815 |
| 5,673,305 A | 9/1997 | Ross | |
| 5,708,417 A | 1/1998 | Tallman et al. | |
| 5,793,122 A | 8/1998 | Dingwall et al. | |
| 6,018,291 A * | 1/2000 | Marble et al. | 340/426.12 |
| 6,021,399 A | 2/2000 | Demers et al. | |
| 6,025,774 A | 2/2000 | Forbes | |
| 6,087,963 A * | 7/2000 | Kobayashi et al. | 340/928 |
| 6,124,805 A | 9/2000 | Gabbard | |
| 6,141,652 A * | 10/2000 | Reeder | 705/53 |
| 6,206,130 B1 | 3/2001 | Hetler | |
| 6,232,884 B1 | 5/2001 | Gabbard | |
| 6,310,542 B1 | 10/2001 | Gehlot | |
| 6,411,217 B1 | 6/2002 | Gabbard | |
| 6,525,672 B2 * | 2/2003 | Chainer et al. | 340/904 |
| 6,799,274 B1 * | 9/2004 | Hamlin | 713/176 |
| 6,870,467 B2 | 3/2005 | Simon | |

* cited by examiner

*Primary Examiner*—Davetta W. Goins
(74) *Attorney, Agent, or Firm*—Crowell & Moring LLP

(57) ABSTRACT

A vehicle disablement device detects whether it has been tampered with. If the vehicle disablement device determines that it has been tampered with, the vehicle disablement device sends a signal to a tamper disabler. The tamper disabler is then able to disable the vehicle in the same manner in which the vehicle disablement device disables the vehicle. Accordingly, the vehicle may be disabled even when the vehicle disablement device is tampered with.

7 Claims, 2 Drawing Sheets

TAMPERING DETECTOR AND SYSTEM DISABLER

The present application is a divisional of U.S. patent application Ser. No. 09/954,004 "Tampering Detector and System Disabler" to Michael P. Simon, filed Sep. 18, 2001; now U.S. Pat. No. 6,870,467 and, the present application claims priority under 35 U.S.C. § 119 to U.S. Provisional Application No. 60/236,392 "Automatic Code System, GETIT, Tamper Proof" to Michael P. Simon, filed Sep. 29, 2000, and U.S. Provisional Application No. 60/288,795 "Tampering Detector and System Disabler" to Michael Simon, filed on May 7, 2001, the disclosure of which applications is herein expressly incorporated by reference.

BACKGROUND OF THE INVENTION

The present invention is related to systems and methods for disabling equipment in response to the failure of a user to perform a specific task. More particulary, the present invention is related to systems and methods for preventing tampering with systems which disable a vehicle in response to the failure of a user to enter a code that corresponds with a stored code in the vehicle.

Typically, monthly payments to utility companies are made with very high reliability. This is partly due to the threat of service cut-off. For example, failure to pay a telephone bill will result in loss of telephone services. Thus, telephone bills are paid regularly because failure to do so has immediate and tangible results. Monthly payments on an automobile loan, for example, are not likely to be paid as regularly. Although an automobile may be repossessed, the process is expensive and complex. Thus, the threat of repossession is less immediate than telephone service cut-off. To encourage reliable loan re-payments, it is desirable to have a "service" cut-off for equipment subject to the loan, such as an automobile.

Conventional systems to encourage reliable loan re-payments interrupt the ignition system of an automobile on a regular, timed interval. To re-enable the automobile, a user is required to return to a payment center, make a payment, and have an agent reset the interrupt mechanism for a renewed timed interval. The system can only be reset by an authorized agent as it requires a key held in escrow at the payment center. While such a system is effective in encouraging users to repay their loans in a timely fashion, it has extreme overhead considerations. For example, the system requires a user to travel to the payment center each payment period of the loan in order to re-enable the automobile. In addition, a user must arrive at the payment center during its customer service hours. Still further, a user may have to wait to receive the attention of the first available agent at the payment center.

One solution to these problems is described in U.S. Pat. No. 6,195,648, entitled "Loan Repay Enforcement System" issued on Feb. 27, 2001 and U.S. patent application Ser. No. 09/397,132, entitled "Time Based Disablement of Equipment" filed on Sep. 16, 1999, both of which are incorporated in their entirety herein by reference. This patent and application describe systems and methods for disabling of equipment if a payment is not timely made. Specifically, a control module associated with the equipment stores a plurality of codes. In order to prevent disablement of the equipment, a code which corresponds to one of the stored plurality of codes must be entered prior to the expiration of a payment period. In order to receive a code, timely payment must be received and logged in a payment center.

If a vehicle disablement device is tampered with or removed, it may be possible to continue to operate the vehicle without having made a proper payment. If it is possible to operate the vehicle without having made a proper payment, the intention of the vehicle disablement device has been overcome. Accordingly, it would be desirable to provide techniques which, in the case that a disablement device is tampered with or removed, the vehicle is still prevented from operating.

SUMMARY OF INVENTION

The above-identified and other deficiencies of prior methods and systems for preventing tampering with a vehicle disablement device. The vehicle disablement device detects whether it has been tampered with. If the vehicle disablement device determines that it has been tampered with, the vehicle disablement device sends a signal to a tamper disabler. The tamper disabler is then able to disable the vehicle in the same manner in which the vehicle disablement device disables the vehicle. Accordingly, the vehicle may be disabled even when the vehicle disablement device is tampered with.

In accordance with the present invention, a vehicle disablement device determines whether a date has passed. If the date has passed then the vehicle disablement device determines whether a code which corresponds to the date has been entered into the device. If the code has been entered into the device or if the date has not passed then it is determined whether the vehicle disablement device has been tampered with. If the vehicle disablement device has been tampered with, then a signal is sent to a tamper disabler to disable a critical system of the vehicle. The vehicle disablement device can communicate through a hard-wire connection, or a wireless connection. Using the tampering detector of the present invention, prevents operation of a vehicle when a vehicle disablement device, which is intended to ensure payment for the vehicle, is tampered with.

BRIEF DESCRIPTION OF THE DRAWINGS

These and other features, aspects, and advantages of the present invention will become better understood with regard to the following description, appended claims and drawings where:

DETAILED DESCRIPTION

In accordance with each of the exemplary embodiments of the invention, there is provided apparatus for and methods of a tamper proof disablement of equipment. It will be appreciated that each of the embodiments described include both an apparatus and a method and that the apparatus and method of one exemplary embodiment may be different than the apparatus and method of another exemplary embodiment.

Figure 1:
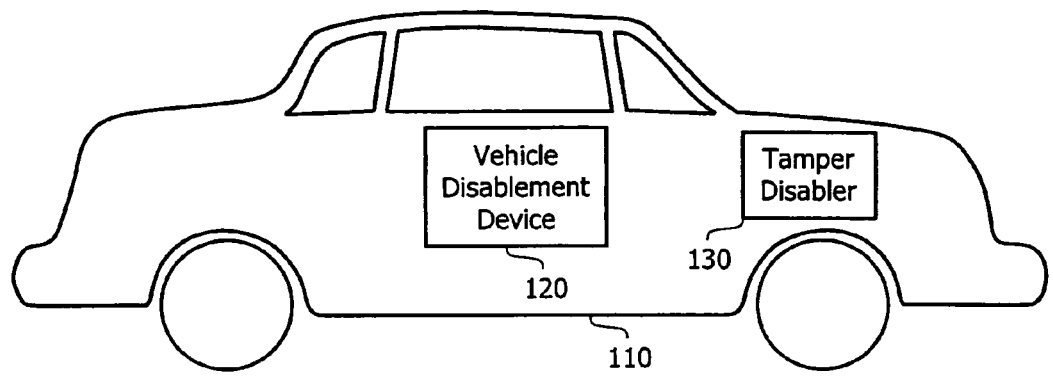
FIG. 1 illustrates a vehicle with a vehicle disablement device and a tamper disabler device in accordance with exemplary embodiments of the present invention.

FIG. 1 illustrates a vehicle with a vehicle disablement device and a tamper disabler device in accordance with exemplary embodiments of the present invention. As illustrated in FIG. 1, a vehicle 110 is equipped with a vehicle disablement device 120 and a tamper disabler 130. In accordance with exemplary embodiments of the present invention, when it is detected that the vehicle disablement device 120 has been tampered with, a wireless signal is sent from the vehicle disablement device 120 to the tamper disabler 130. The wireless signal can be a radio frequency signal, an infrared signal or any other known type of wireless signal. By sending a wireless signal from the vehicle disablement device 120 to the tamper disabler 130, the tamper disabler can be located in any portion of vehicle 110. Further, since there are no wires connecting vehicle disablement device 120 and tamper disabler 130, it is difficult for a person who is attempting tamper with vehicle disablement device 120, from discovering the existence, let alone the location, of tamper disabler 130. Alternatively, vehicle disablement device 120 and tamper disabler 130 can be connected by a hard-wire connection.

Figure 2:
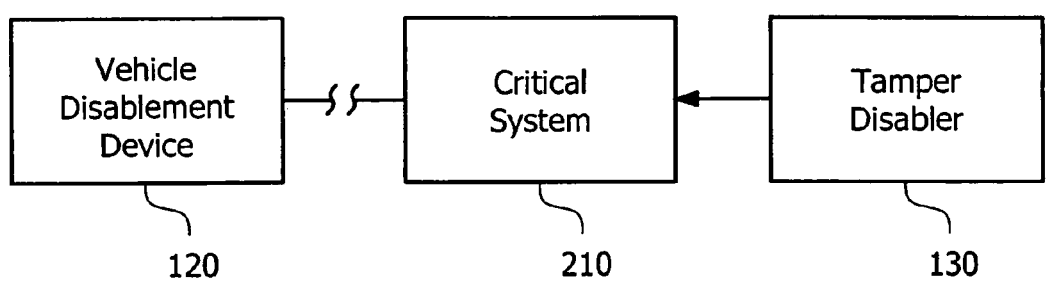
FIG. 2 illustrates the relationship between a vehicle disablement device, a critical system and a tamper disabler in accordance with exemplary embodiments of the present invention.

FIG. 2 illustrates the relationship between a vehicle disablement 130 device, a critical system of a vehicle and a tamper disabler. As illustrated in FIG. 2, both the vehicle disablement device 120 and the tamper disabler are connected to a critical system 210 of a vehicle. Accordingly, if vehicle disablement device 120 is tampered with such that the device can no longer disable critical system 210, tamper disabler 130, upon receipt of a signal from vehicle disablement device 120, can still disable a critical system 210 of a vehicle.

Since vehicle disablement device 120 may be powered by the vehicle, removing the vehicle disablement device 120 from the vehicle, e.g., by cutting the wires connecting the vehicle disablement device to the vehicle, the vehicle disablement device may no longer have power to send the signal to tamper disabler 130. In accordance with exemplary embodiments of the present invention, the vehicle disablement device can be provided with a battery with a sufficient amount of power for sending the tamper disabling signal to the tamper disabler 130 in case the main source of power to the vehicle disablement device is removed. In accordance with another exemplary embodiment of the present invention, the vehicle disablement device may store power it has received from the vehicle such that when the vehicle's power to the vehicle disablement device 120 is removed the vehicle disablement device 120 can still transmit the tamper disabling signal. In accordance with a further embodiment of the present invention, vehicle disablement device 120 can be powered by solar cells. The vehicle disablement device 120 can store this power via a capacitor, a rechargeable battery or any other known means for storing power. Since the vehicle disablement device 120 will only need to transmit the tamper disablement signal immediately after a tamper is detected, the amount of power that needs to be stored in the vehicle disablement device can be quite minimal.

Figure 3:
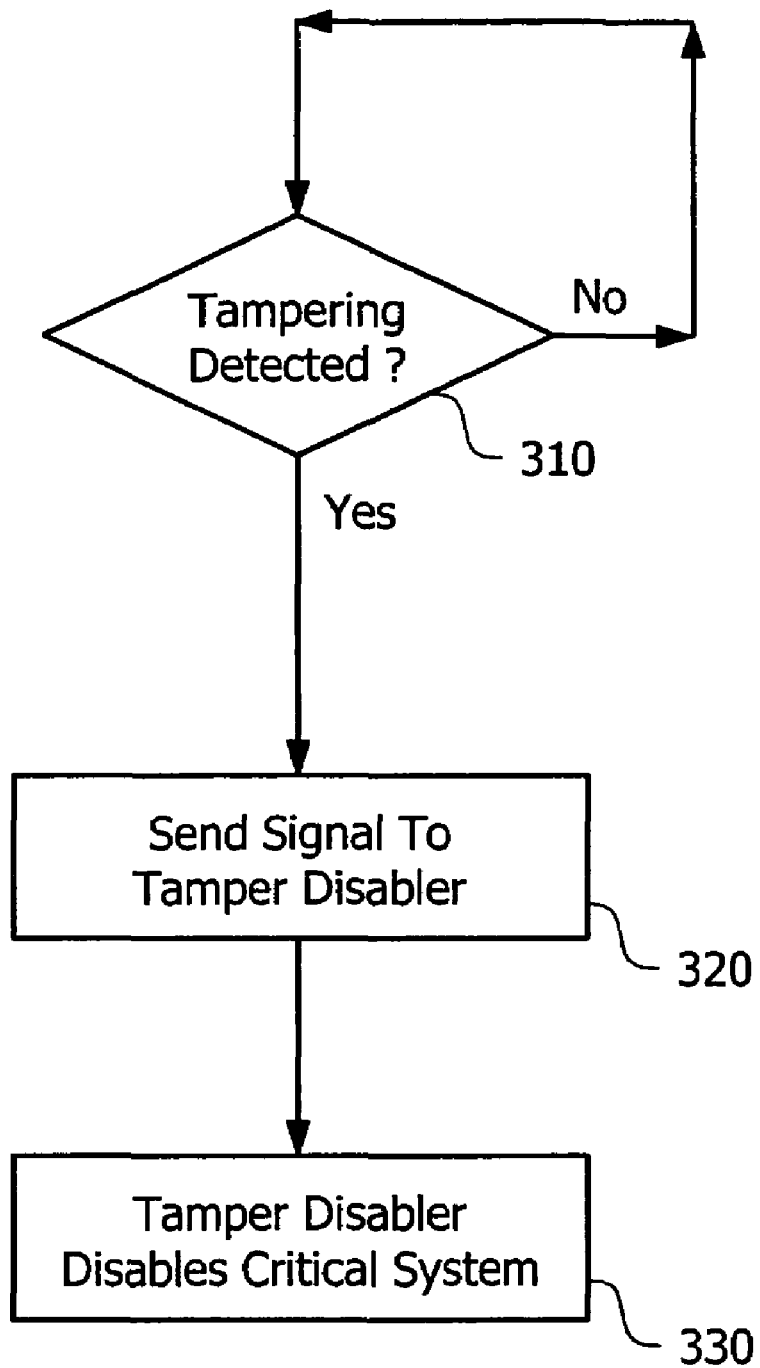
FIG. 3 illustrates a method for tamper disablement in accordance with exemplary embodiments of the present invention.

FIG. 3 illustrates an exemplary method in accordance with the present invention. Initially, the vehicle disablement device determines whether it has detected a tampering (step 310). In accordance with the present invention there are many techniques for detecting a tampering. In accordance with one embodiment of the present invention, the vehicle disablement device can detect a tampering by determining whether its power from the vehicle has been interrupted. In accordance with another embodiment of the present invention, the tampering can be detected based upon movement of the vehicle disablement device. Typically the vehicle disablement device will be securely mounted in a vehicle. Accordingly, if a movement, other than normal movements due to driving, is detected the vehicle disablement device can determine that a tampering is taking place.

If the vehicle disablement device does not detect tampering ("NO" path out of decision step 310), the vehicle disablement device continues to monitor for tampering. If, however, the vehicle disablement device detects tampering ("YES" path out of decision step 310), then the vehicle disablement device sends a signal to the tamper disabler (step 320). The tamper disabler then disables a critical system of the vehicle, thereby preventing operation of the vehicle (step 330).

Although not illustrated in FIG. 3, the method can also include the steps of: the user inputting the code into a time-based equipment disablement device; the time based disablement device comparing the code received from the user with codes stored in memory; and if there is a match, storing an indication in the time-based disablement device that the code has been entered, thereby allowing the user to operate the equipment associated with the time-based disablement device until the date and/or time associated with a code which has not been entered has occurred. In addition, the method can include the steps of: determining whether a date and/or time has occurred; if the date and/or time has occurred, determining whether a code associated with the date and/or time has been input into the time-based equipment disablement device; disabling the equipment if the code has not been previously entered; and allowing the equipment to operate if the code has been previously entered. Further, the disablement device can include a plurality of lights, e.g., light emitting diodes, to indicate if the end of a payment period is upcoming. For example, a green light would indicate that no payment is due, a yellow light would indicate that a payment is due shortly, and a red light would indicate that a payment is due immediately or the equipment will be disabled. Further, the lights can blink at an increasing frequency the closer in time it is to a payment due deadline. In addition to the use of lights to indicate whether a payment is upcoming or due, an audible beep or other sound can be used to indicate such. For example, a single beep can be used to indicate that a payment is upcoming and a constant beep can indicate that a payment is passed due.

Although exemplary embodiments of the present invention have been described in connection with particular types of vehicle disablement devices, it will be recognized that the present invention is equally applicable to any type of vehicle disablement devices. Further, although exemplary embodiments of the present invention have been described in connection with a vehicle disablement device, it will be recognized that the present invention is equally applicable to any type of disablement device. Additionally, although exemplary embodiments of the present invention were described in connection with loan payments, the present invention is equally applicable to any other type of financing arrangements including leases and the like. Moreover, although it has been described that the vehicle disablement device detects the tampering and sends a signal to the tamper disabler, another device can be used to perform the detecting and sending. In addition, the tamper disabler can perform the detecting, thereby obviating the sending step.

Although the present invention has been described in considerable detail with clear and concise language and with reference to certain exemplary embodiments thereof including the best mode anticipated by the inventors, other versions are possible. Therefore, the spirit and scope of the invention should not be limited by the description of the exemplary embodiments contained therein.

What is claimed is:

1. A system for disabling equipment comprising:
an equipment disablement device, wherein the equipment disablement device disables the equipment if a payment is not made on the equipment prior to a payment due date; and a tamper disabler which receives a signal from the equipment disablement device if the equipment disablement device detects it is being tampered with and which disables the equipment.

2. The system of claim 1, wherein the tamper disabler further comprises:

a backup power source for powering the tamper disabler if a primary source of power for the tamper disabler fails.

3. The system of claim 1, wherein the equipment is a vehicle.

4. A method for disabling a equipment comprising the steps of:

determining whether an equipment disablement device is being tampered with;

sending a signal to a tamper disabler if it is determined that the equipment disablement device is being tampered with; and disabling, by the tamper disabler, equipment if it is determined that the equipment disablement device is being tampered with, wherein the equipment disablement device is connected to a critical system and disables the critical system if a payment is not made prior to a payment due date.

5. The method of claim 4, wherein the equipment disablement device performs the determining and sending steps.

6. The method of claim 4, wherein another device performs the determining and sending steps.

7. A method for disabling a vehicle comprising the steps of:

determining, by a vehicle disablement device, whether a date has passed;

determining, if the date has passed, whether a code which corresponds to the date has been entered into the device;

determining, if the code has been entered into the device or if the date has not passed, whether the vehicle disablement device has been tampered with;

sending a signal to a tamper disabler to disable a critical system of the vehicle if the vehicle disablement device has been tampered with.

* * * * *